US011368402B1

(12) United States Patent
Coddington et al.

(10) Patent No.: US 11,368,402 B1
(45) Date of Patent: Jun. 21, 2022

(54) SYSTEM AND METHOD FOR USING SOFT LOCK WITH VIRTUAL CHANNELS IN A NETWORK-ON-CHIP (NOC)

(71) Applicant: ARTERIS, INC., Campbell, CA (US)

(72) Inventors: John Coddington, Cedar Park, TX (US); Benoit de Lescure, Campbell, CA (US); Syed Ijlal Ali Shah, San Jose, CA (US); Sanjay Despande, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/134,400

(22) Filed: Dec. 26, 2020

(51) Int. Cl.
*H04L 47/32* (2022.01)
*G06F 15/78* (2006.01)
*H04L 47/625* (2022.01)

(52) U.S. Cl.
CPC .......... *H04L 47/32* (2013.01); *G06F 15/7825* (2013.01); *H04L 47/626* (2013.01)

(58) Field of Classification Search
CPC .... H04L 47/32; H04L 47/626; G06F 15/7825
USPC ........................................................ 370/230
See application file for complete search history.

(56) References Cited

U.S. PATENT DOCUMENTS

| 2015/0109024 A1* | 4/2015 | Abdelfattah | G06F 30/34 326/41 |
| 2017/0005951 A1* | 1/2017 | Labonte | H04L 47/6205 |
| 2018/0077228 A1* | 3/2018 | Blagodurov | H04L 67/1008 |

* cited by examiner

*Primary Examiner* — Kwang B Yao
*Assistant Examiner* — Syed M Bokhari
(74) *Attorney, Agent, or Firm* — Dana Legal Services; Jubin Dana (57) ABSTRACT

A system and method for soft locking on an ingress port of a networking device in a network, such as a network-on-chip (NoC). Once a soft lock is established, the port is given transmitting priority so long has the port has an available packet or packet parts that can make forward progress in the network. When the soft lock port's packet parts, which can make forward progress in the network, are not available, the networking device may choose another port. The system transmits packet parts from the other port until the soft locked port has packet parts available that can make forward progress in the network. Any arbitration scheme may be used to select the port that is soft locked and to select the other ports to transmit from when the soft locked port does not have packet parts that can make forward progress in the network. Once the packet (or all the packet parts) on the soft locked port has completed transmission, the soft lock of the soft locked port is released.

15 Claims, 10 Drawing Sheets

SYSTEM AND METHOD FOR USING SOFT LOCK WITH VIRTUAL CHANNELS IN A NETWORK-ON-CHIP (NOC)

FIELD OF THE INVENTION

The present technology is in the field of computer system design and, more specifically, related to a network packet routing scheme for a network-on-chip (NoC).

BACKGROUND

Within a network on chip (NoC), packets may be transported from a source to a destination. At times, the packet may be split into parts. For example, when a packet is too large for the capacity of a network switch in a single clock cycle. A NoC may lock onto a network port (e.g., an ingress port of a network switch) and stay locked onto the port until the packet associated with the port has been completely transmitted. After the packet has been transmitted, the lock is released. Virtual channels (VC) may allow multiple sources to share the same physical medium or channel, e.g., by multiplexing in time.

A NoC may arbitrate between VCs for a resource (e.g., an ingress port of a switch) by looping through each VC while transmitting the VCs packet parts. Under certain situations, this can degrade system performance due to the destination having packet parts from multiple channels and not having a complete packet. In this situation, the destination is needlessly waiting on a complete packet to begin processing. For example, three VCs are transmitting each VCs packet parts by looping through each channel while transmitting the respective VCs packet part. In this example, though the destination has packet parts from all three VCs, the destination lacks a complete packet that is needed to begin processing the packet. In another scenario, the NoC may lock onto a network port to transmit all the packets parts for a packet. Under this scenario, if the packet parts are not available for the locked port, the system may deadlock while waiting on the next locked packet part to arrive. Therefore, what is needed is a system and a method that can lock onto a network port to transmit all the packet parts, and if the locked packet does not have packet parts available, may switch to another network port.

SUMMARY

In accordance with the various aspects and embodiments of the invention, a system and a method are disclosed that lock onto a network port to transmit all the packet parts, and if the locked port does not have packet parts available that can make forward progress in the network, may switch to transmitting from another network port. As used herein, soft lock generally refers to a lock on a network port (e.g., an ingress port of an arbiter) that allows another network port to transmit when the soft lock port does not have available packet parts that can make forward progress in the network.

According to one or more embodiments and aspects of the invention, a soft lock is assigned to a network port. Once the soft lock is established, the soft lock port transmits packet parts from the soft lock port until either the end of the packet is reached or there are no soft lock packet parts available that can make forward progress in a network. When no soft lock port packet parts are available that can make forward progress in the network, another network port packet part is transmitted until the soft lock port has packet parts available that can make forward progress in the network. When the soft lock port has available packet parts that can make forward progress in the network, the soft lock port packet parts are again transmitted. Once the soft lock port packet has been transmitted completely (e.g., the end of the packet transmitted), the soft lock is released. According to one or more embodiments of the invention, each ingress port may be a separate virtual channel.

According to one or more embodiments and aspects of the invention, a soft lock is assigned to a network port. Once the soft lock is established, the soft lock port transmits packet parts from the soft lock port until either the end of the packet is reached or there are no more soft lock packet parts available that can make forward progress in a network. When no soft lock port packet parts are available, the soft lock port is stored as the original soft lock and another network port is assigned the soft lock. Packet parts are transmitting on the new soft lock port until the complete packet has been transmitted or there are no more available packet parts that can make forward progress in a network, at which time the soft lock port will be reassigned to the original soft lock port and the soft lock process is continued.

Any arbitration scheme may be used to assign a soft lock to a network port (e.g., priority, first in first out (FIFO), round robin, time packet arrives, ability of packet to make forward progress, etc.). When no soft lock port packet parts are available that can make forward progress in a network, any arbitration scheme may be used to choose another network port (e.g., priority, first in first out (FIFO), round robin, time packet arrives, ability of packet to make forward progress, etc.). According to one or more embodiments and aspects of the invention, a network port may be soft locked onto, at any time during the packet transmission (e.g., at beginning of the packet, during transmission, etc.). According to one or more embodiments and aspects of the invention, each arbiter may contain a separate soft lock mechanism and each arbiter may function independently of other arbiters. According to one or more embodiments and aspects of the invention, each egress port may have a separate soft lock mechanism and each egress port may function independently of other egress ports.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

According to one or more embodiments and aspects of the invention, the network is a NoC. While not specifically mentioned, other network elements are contemplated and within the scope of the invention. In wormhole networks that have no virtual channels (VCs) an egress port becomes locked on a packet when the packet starts transmitting. In this example, the header wins arbitration. The egress port unlocks when the end of the packet passes through, which is the tails of the packet. In other words, all FLITs of the packets go through the egress port uninterrupted. Locking on an egress ort cannot occur when arbitrating between VCs, as discussed below with respect to FIG. 1, because it will cause deadlock, especially if virtual channels are used to solve topological dependencies issues in topologies with loops. In accordance with some aspects and embodiments of the invention, the system disclosed uses "soft" locking, as detailed herein. According to one or more embodiments and aspects of the invention, a NoC may implement, at least partially, a wormhole routing algorithm. When wormhole routing is implemented, part of a packet may be a FLIT (flow control unit), the beginning of the packet is the head, and the end of the packet is the tail. The NoC may implement one or more VCs.

As used herein, "forward progress" generally refers to the general direction a packet is travelling and does not specify a specific direction the packet is traveling. The terms "signal path," "path," and "route" are used interchangeable herein. Paths includes and are made up of any combination of end points and edges (edges are also referred to herein as links), along which a transaction in the form or a signal or data travels form source to destination (sink or target).

As used herein, a "master," an "initiator," and a "source" refer to similar intellectual property (IP) blocks, units, or modules. The terms "master" and "initiator" and "source" are used interchangeably within the scope and embodiments of the invention. As used herein, a "slave," a "target," and a "sink" refer to similar IP blocks; the terms "slave" and "target" and "sink" are used interchangeably within the scope and embodiments of the invention. As used herein, a transaction may be a request transaction or a response transaction. Examples of request transactions include write request and read request.

Figure 1:
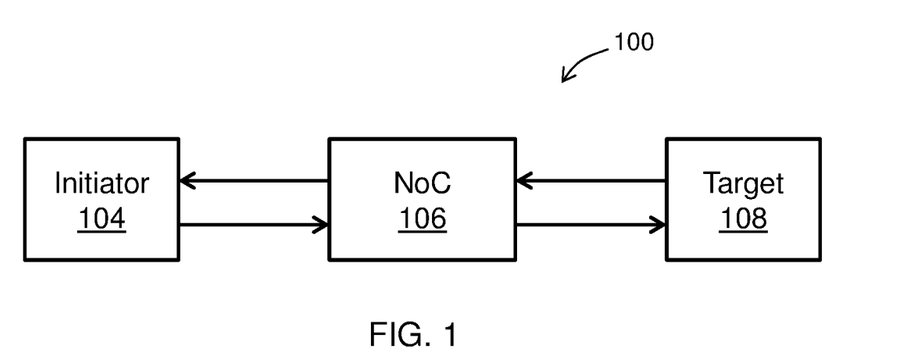
FIG. 1 shows a system having an initiator, a network-on-chip (NoC), and a target, in accordance with the various aspects and embodiments of the invention.

Referring now to FIG. 1, a system 100 is shown having an initiator 104 that is connected to the network-on-chip (NoC) 106 with a path that carries signals. The initiator 104 communicates with a target 108 through the NoC 106. The initiator 104 and the target 108 are connected to the NoC 106 with respective paths that carry signals or data packets from the initiator 104 to the target 108 and vise-versa. The initiator 104 sends requests to the target 108. The target 108 sends responses to the initiator 104. The responses and requests are considered transactions that travel through the NoC 106.

Figure 2:
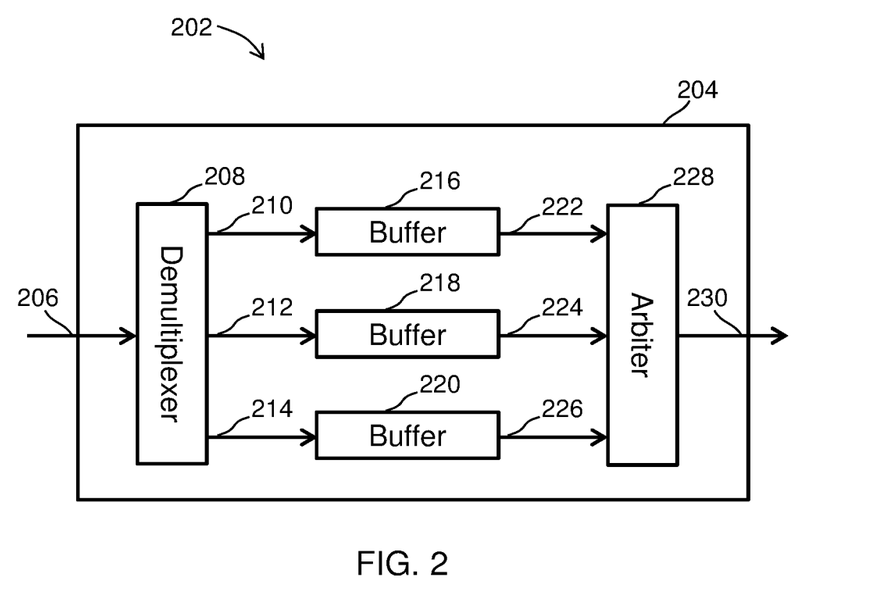
FIG. 2 shows a single channel switch capable of soft locking an egress port of an arbitrator to any ingress port of the arbiter, in accordance with the various aspects and embodiments of the invention.

Referring now to FIG. 2, a virtual channel (VC) enabled switch 204 of a system 202 is shown according to one or more embodiments and aspects of the invention. Switch 204 arbitrates, using arbiter 228, between ingress port 206 and egress port 230 for virtual channels 210, 212, and 214. Ingress port 206 may contain one or more virtual channels.

Arbiter 228 soft locks egress port 230 onto one of its ingress ports. In accordance with one embodiment and aspect of the invention, arbiter 228 includes one ingress port per virtual channel that can access egress port 230 of the switch 204 and each ingress port carries packets from the same virtual channel. In accordance with the various aspects and embodiments of the invention, a packet may be transmitted to the egress port 230 in its entirety as a complete packet. In accordance with the various aspects and embodiments of the invention, a packet may be broken into packet parts and each packet part can be transmitted to the egress port 230 from start to end, in separated transmissions, until the entire packet is transmitted, such that the packet parts make-up a complete packet.

As discussed in greater detail herein, once a packet on a given VC starts transmitting, the output (egress) port is soft locked onto that packet and VC; this will give that packet preference if it can make forward progress. If, while in the middle of the packet, the packet can no longer make forward progress, the output port will swap to another contending packet, on a different VC, that is available and can progress. As soon as the original packet can make forward progress again, the output port is again soft locked and returns to the original VC to transmit the remaining portion of original packet.

Demultiplexer 208 separates virtual channels 210, 212, and 214 from the signals on ingress port 206. Virtual channels 210, 212, and 214 are stored in buffers 216, 218, and 220, respectively. Buffers 216, 218, and 220 transmit on virtual channels 222, 224, and 226, respectively. The virtual channels 222, 224, and 226 are ingress ports 22, 224, and 226, respectively, to arbiter 228. Arbiter 228 selects one ingress port (a virtual channel) to soft lock to egress port 230 in order to transmit packets over egress port 230. Arbiter 228 performs soft locking by locking the egress port 230 to any one of the ingress ports of the arbiter 228. As used herein, the terms "soft lock" and "soft locked" are used interchangeably. The arbiter 228 has three ingress ports (virtual channels) in accordance with the embodiment shown. The scope of the present invention is not limited by the number of virtual channels the arbiter handles.

The determination of the port, which is soft locked, may be done using any arbitration scheme. For example, after performing arbitration based on priority, arbiter 228 may soft lock egress port 230 to the arbiter 228's ingress port for virtual channel 222, and may transmit all packet parts of virtual channel 222 for the current packet until either no packet parts are currently available that can make forward progress in a network or the complete packet is transmitted. If virtual channel 222 has no packet parts available that can make forward progress in the network, arbiter 228 may choose packet parts from either virtual channel 224 or virtual channel 226. In this case, any arbitration scheme may be used to select between virtual channels 224 or virtual channel 226. When packet parts for virtual channel 222 become available that can make forward progress in the network, arbiter 228 switches transmission to virtual channel 222. When the complete packet for virtual channel 222 is transmitted (e.g., reach the end of the packet), the soft lock is released. According to one or more embodiments and aspects of the invention, the ingress and egress ports are virtual, and the internal circuitry to switch 204 are physical.

Figure 3:
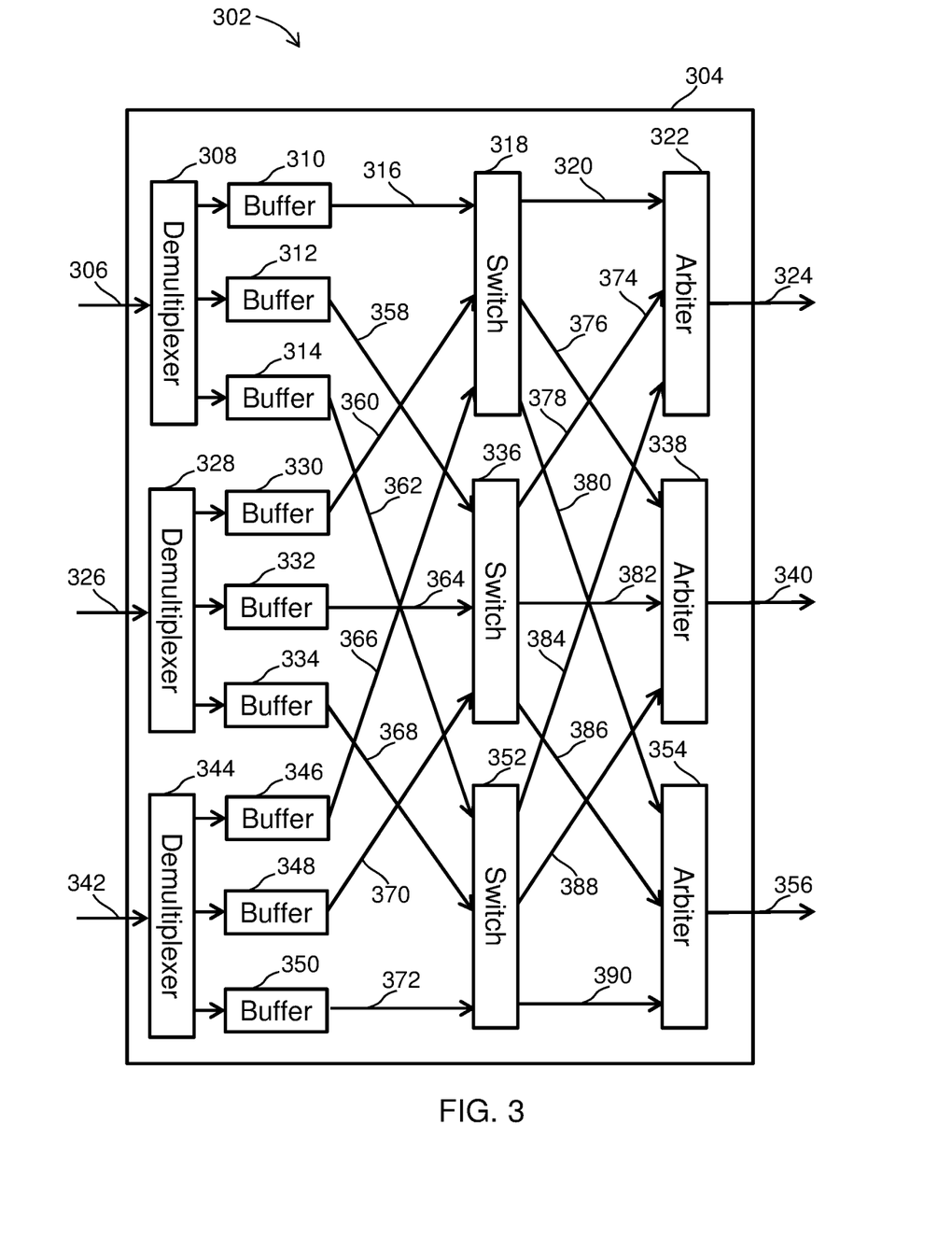
FIG. 3 shows a three-channel switch capable of soft locking an egress port of to any ingress port of an arbiter, in accordance with the various aspects and embodiments of the invention.

Referring now to FIG. 3, a system 302 is shown, according to one or more embodiments and aspects of the invention. Switch 304 arbitrates between ingress ports 306, 326, and 342 and egress ports 324, 340, and 356 for virtual channels 316, 320, 358, 360, 362, 364, 366, 368, 370, 372, 374, 376, 378, 380, 382, 384, 386, 388, and 390. Each ingress port (i.e., 306, 326, and 342) includes three virtual channels and the three virtual channels are the same for each ingress port. The first virtual channel contains first virtual channels 316, 360, and 366. The second virtual channel contains second virtual channels 358, 364, and 370. The third virtual channel contains third virtual channels 362, 368, and 372.

Demultiplexer 308 separates the first virtual channel 316, the second virtual channel 358, and the third virtual channel 362 from signals on ingress port 306. Buffers 310, 312, and 314 perform buffering on the first virtual channel 316, the second virtual channel 358, and the third virtual channel 362, respectively. Demultiplexer 308, and buffers 310, 312, and 314 may perform the same or similar to demultiplexer 208, and buffers 216, 218, and 220, respectively, of FIG. 2.

Demultiplexer 328 separates the first virtual channel 360, the second virtual channel 364, and the third virtual channel 368 from signals on ingress port 326. Buffers 330, 332, and 334 perform buffering on first virtual channel 360, the second virtual channel 364, and the third virtual channel 368, respectively. Demultiplexer 328, and buffers 330, 332, and 334 may perform the same or similar to demultiplexer 208, and buffers 216, 218, and 220, respectively, of FIG. 2.

Demultiplexer 344 separates the first virtual channel 366, the second virtual channel 370, and the third virtual channel 372 from the signals on ingress port 342. Buffers 346, 348, and 350 perform buffering on the first virtual channel 366, the second virtual channel 370, and the third virtual channel 372, respectively. Demultiplexer 344, and buffers 346, 348, and 350 may perform the same or similar to demultiplexer 208, and buffers 216, 218, and 220, respectively, of FIG. 2.

First switch 318 switches from first virtual channels 316, 360, and 366 to first virtual channels 320, 376, and 380. Second switch 336 switches from second virtual channels 358, 364, and 370 to second virtual channels 378, 382, and 386. Third switch 352 switches from third virtual channels 362, 368, and 372 to third virtual channels 384, 388, and 390.

First arbiter 322 selects between first virtual channel 320, second virtual channel 374, and third virtual channel 384 to transmit over egress port 324. First arbiter 322 may be the same or similar to arbiter 228 of FIG. 2. Second arbiter 338 selects between first virtual channel 376, second virtual channel 382, and third virtual channel 388 to transmit over egress port 340. Second arbiter 338 may be the same or similar to arbiter 228 of FIG. 2. Third arbiter 354 selects between first virtual channel 380, second virtual channel 386, and third virtual channel 390 to transmit over egress port 356. Third arbiter 354 may be the same and similar to arbiter 228 of FIG. 2.

The determination of the soft lock port may be done with any arbitration scheme. For example, after performing arbitration based on priority, arbiter 322 may soft lock on the arbiter port for first virtual channel 320 and may transmit all packet parts of first virtual channel 320 for the current packet until either no packet parts are available that can make forward progress in a network, or the complete packet is transmitted. If first virtual channel 320 has no packet parts available that can make forward progress in a network, arbiter 322 may choose packet parts from either second virtual channel 374 or third virtual channel 384. In this case, any arbitration scheme may be used to select between second virtual channel 374 and third virtual channel 384. When packet parts for first virtual channel 320 become available that can make forward progress in the network, transmission is switched to first virtual channel 320. When the complete packet for first virtual channel 320 is transmitted (e.g., reach the end of the packet), the soft lock is released.

Each arbiter may soft lock on any arbiter port. For example, second arbiter 338 may soft lock on the port for second virtual channel 382. Each arbiter may soft lock on different ports. For example, first arbiter 322 may soft lock on the port for first virtual channel 320, second arbiter 338 may soft lock on the port for second virtual channel 382, and third arbiter 354 may soft lock on the port for third virtual channel 390.

Though FIG. 3 shows three ingress ports (i.e., ingress ports 306, 326, and 342), three egress ports (i.e., ingress ports 324, 340, and 356), and three virtual channels (e.g., first virtual channel 316, second virtual channel 364, and third virtual channel 372), any number of ingress ports, egress ports, and virtual channels may be used. Furthermore, each ingress port (i.e., ingress ports 306, 326, and 342) may have the same number or a different number of virtual channels.

Figure 4:
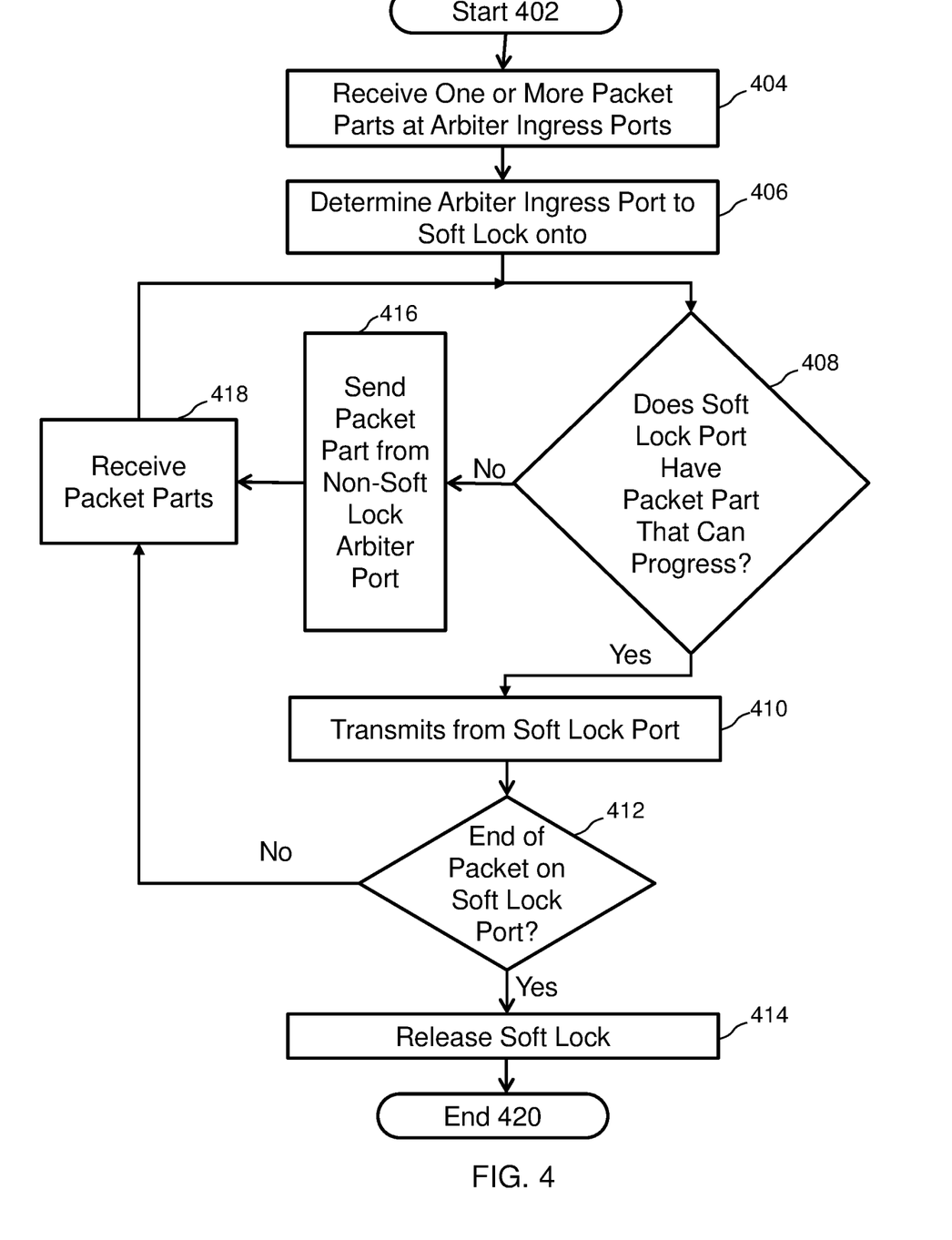
FIG. 4 shows a soft lock process that when no soft lock port packet parts are available, another port packet parts are transmitted until soft lock port data is available that can make forward progress in a network, in accordance with the various aspects and embodiments of the invention.

Referring now to FIG. 4, a process is shown for soft locking that starts at step 402. In accordance with some embodiments and aspects of the invention, a soft lock process described in FIG. 4 may lock onto an arbiter ingress port until ither all parts of the packet (for a soft locked port's packet parts of a packet) are transmitted or no packet parts (for a soft lock port's packet parts or a packet) are currently available that can make forward progress in a network. When no soft lock packet parts are available that can make forward progress in the network, another arbiter port's packet parts are transmitted until the soft locked port has packet parts available that can make forward progress in the network. According to one or more embodiments and aspects of the invention, a traditional routing algorithm may include the soft lock process discussed herein. According to one or more embodiments and aspects of the invention, the soft lock process may be disabled and the arbiter may perform a traditional routing algorithm.

At step 404, one or more packet parts are received by one or more arbiter ingress ports. Packet parts include a partial packet (e.g., beginning of packet, packet part, packet end, etc.) and a complete packet. Packet parts may be received in any manner capable of receiving packet parts, e.g., every clock cycle, at a fixed time interval, asynchronously, etc.

At step 406, an arbiter determines the ingress port to soft lock onto. Any process capable of determining a port to soft lock onto may be used. For example, an arbitration scheme may be used to assign a soft lock to an arbiter port (e.g., priority, first in first out (FIFO), round robin, time packet arrives, etc.). Details of determining the soft lock port will be described in more detail in reference to FIG. 8 below.

At step 408, a determination is made if the soft lock port has packet parts to transmit that can make forward progress in the network. The soft lock port may be examined to determine if a packet or part of a packet is available that can make forward progress in the network. The determination of the capacity of the networking component to receive the packet or a packet part may be determined by any method capable of determining if a packet or a packet part can make forward progress in the network. For example, a credit based system may be used to determine if a packet or packet part may make forward progress in the network. Once the soft lock port is determined, the determined port is designated as the soft lock port.

If step 408 determines the soft lock port packet part is available that can make forward progress in the network, step 410 is performed. If step 408 determines that that the soft lock port packet part is not available that can make forward progress in the network, step 416 is performed.

At step 410, the arbiter transmits the packet part present on the soft lock port. At step 412, the determination is made if the end of the packet on the soft lock port has been transmitted. If the end of the packet (or all packet parts) on the soft lock port has been transmitted in step 412, the soft lock is released in step 414 and the process is ended at step 420. The process may be started again at step 402. If the end of the soft lock packet port is not reached in step 412, step 418 is performed.

At step 416, the arbiter may transmit a packet part from an ingress port other than the soft lock port. Each time step 416 is performed, a different port other than the soft lock port may be selected. For example, when the arbiter is soft locked on port A and selects port B to transmit the packet part, then if during the next clock cycle port A does not have packet parts available that can make forward progress in the network and port B does not have packet parts available that can make forward progress in the network, then port C may be selected to transmit packet parts. When the ports other than the soft lock port have no packet parts available that can make forward progress in the network, step 416 may be skipped.

At step 418, one or more packet parts are received on one or more ingress ports of the arbiter. The received packet parts may be on any port of the arbiter including the soft lock port and the ports that do not have the soft lock. In accordance with some aspects and embodiments of the invention, the data received may be an entire packet and not just a packet part.

Figure 5:
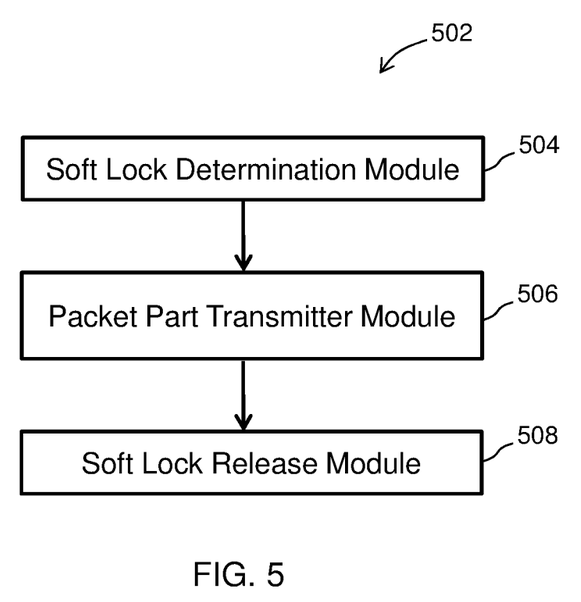
FIG. 5 shows a system for performing soft lock that when no soft lock port packet parts are available, another port packet parts are transmitted until soft lock port data is available that make forward progress in a network, in accordance with the various aspects and embodiments of the invention.

Referring now to FIG. 5, a system 502 is shown in accordance with some embodiments and aspects of the invention. System 502 includes soft lock determination module 504, packet part transmission module 506, and soft lock release module 508. System 502 may perform the same or similar function as steps 402 through steps 420 of FIG. 4.

Soft lock determination module 504 determines the arbiter ingress port to soft lock on and assigns a soft lock to the determined port. Soft lock determination module 504 may perform the same or similar function as steps 404 and 406 of FIG. 4. Packet part transmission module 506 transmits the soft lock port packet parts when the soft lock port has packet parts available that can make forward progress in a network. When the soft lock does not have packet parts available that can make forward progress in the network, a non-soft lock arbiter port packet parts may be transmitted. Packet part transmission module 506 may perform the same or similar function as steps 408, 410, 412, 416, and 418 of FIG. 4. Soft lock release module 508 releases the soft lock once the entire packet is transmitted from the soft lock port. Soft lock release module 508 may perform the same or similar function of step 414 of FIG. 4.

Figure 6:
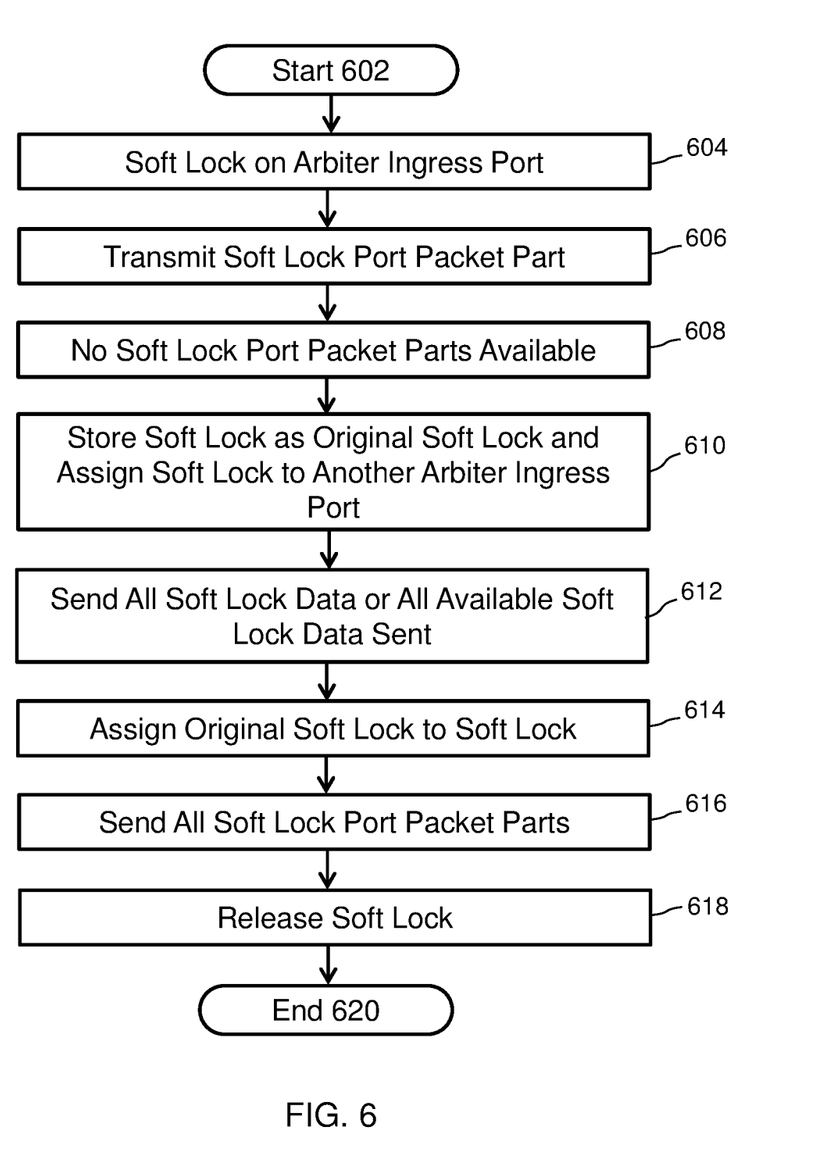
FIG. 6 shows a soft lock process that when no soft lock port packet parts are available that can make forward progress in a network, the soft lock is moved to another port and then returned to the original soft lock port, in accordance with the various aspects and embodiments of the invention.

Referring now to FIG. 6, soft locking is started with step 602. In accordance with some embodiments and aspects of the invention, a soft lock process described in FIG. 6 may lock onto an arbiter port until either all parts of the packet are transmitted, or no packet parts are currently available that can make forward progress in a network. When no soft lock packet parts are available that can make forward progress in the network, the soft lock may be moved to another arbiter port and the previous soft lock may be stored as original soft lock. Operation proceeds with the other soft lock in a similar fashion as the original soft lock where if the soft lock port has packet parts available that can make forward progress in the network, the soft lock port packet part will be transmitted. If the soft lock packet part is not available that can make forward progress in the network, the soft lock is moved to the original soft lock port and the aforementioned process is repeated.

At step 604, an arbiter determines the ingress port to soft lock on and assigns the soft lock to the determined port. Step 604 may be the same or similar to step 406 in FIG. 2.

At step 606, soft lock packet parts are available that can make forward progress in the network, and soft lock port packet parts are transmitted. At step 608, no soft lock port packet parts are available that can make forward progress in the network.

At step 610, the current soft lock port is stored as original soft lock port and the soft lock port is assigned to another arbiter ingress port. Selecting the new soft lock may be done with any soft lock determination procedure, e.g., an arbitration scheme. The original soft lock port may be stored in any way of storing reference to an ingress port of an arbiter. For example, the original soft lock port may be stored as a reference to the port, as a flag in the arbiter hardware, etc. Additionally or alternatively, the soft lock port may be released and then assigned to another arbiter ingress port.

At step 612, either all the soft lock port packet parts are transmitted or no soft lock packet parts are available that can make forward progress in the network. It is noted at this point that the current soft lock port is the other arbiter ingress port that was set in step 610.

At step 614, soft lock port is assigned the original soft lock port. It is noted that the current soft lock port is the same soft lock port that was assigned in step 604. At step 616, soft lock packet parts are transmitted until the end of the soft lock port packet is reached. It is noted that in step 616 it is assumed a continuous stream of soft lock port packet parts that can make forward progress are at the arbiter ingress soft lock port. At step 616, all soft lock port packet parts are transmitted. In other words, the arbiter has transmitted the end of the soft lock port packet. In step 618, the soft lock port is released. The process is ended at step 620.

Though FIG. 6 teaches a soft lock port and an original soft lock port, any number of soft lock ports may be stored. For example, in addition to the original soft lock port, a second original soft lock port and third original soft lock port may be stored. In this situation, each time a soft lock packet parts are not available that can make forward progress, the current soft lock port may be stored and a new soft lock port assigned that has packet parts available that can make forward progress in the network.

Figure 7:
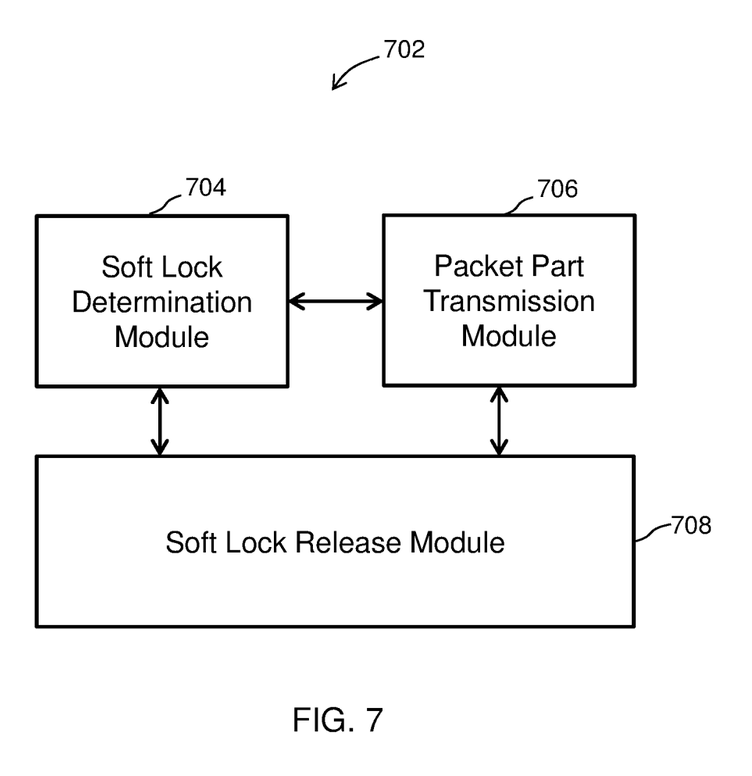
FIG. 7 shows a system for performing soft lock that when no soft lock port packet parts are available that can make forward progress in a network then the soft lock is moved to another port and then returned to the original soft lock port, in accordance with the various aspects and embodiments of the invention.

Referring now to FIG. 7, a system 702 is shown in accordance with some embodiments and aspects of the invention. System 702 includes soft lock determination module 704, packet part transmission module 706, and soft lock release module 708. System 702 may perform the same or similar function as steps 602 through steps 620 of FIG. 6.

Soft lock determination module 704 determines the arbiter port to soft lock on and assigns a soft lock to the determined port. Soft lock determination module 704 may perform the same or similar function as steps 404 and 406 of FIG. 4. When the current soft lock port packet parts are not available that can make forward progress in a network, soft lock determination module 704 may store the current soft lock port as an original soft lock port and assign the soft lock to another port of the arbiter. When the re-assigned soft lock port either transmits the complete packet or no packet parts are available that can make forward progress in the network, the soft lock port may be assigned to the original soft lock port. Soft lock determination module 704 may perform the same or similar function to steps 604, 610, and 614 of FIG. 6. Additionally or alternatively, the soft lock port may be released and then assigned to another arbiter ingress port.

Packet part transmission module 706 transmits the soft lock port packet parts. When soft lock packet parts are not available that can make forward progress in the network, packet part transmission module 706 may indicate to the soft lock determination module 704 that either soft lock packet parts are not available and/or cannot make forward progress. In response to the indication that soft lock packet parts are not available and/or cannot make forward progress, soft lock determination module 704 may re-assign the soft lock port to another port on the arbiter. This may be the same or similar function of steps 610 and 614 of FIG. 6.

Soft lock release module 708 releases the soft lock port when instructed by soft lock determination module 704. Additionally or alternatively, soft lock release module 708 may release the soft lock when the end of the packet on the soft lock port is reached. Soft lock release module 708 may perform the same or similar function of step 618 of FIG. 6.

Figure 8:
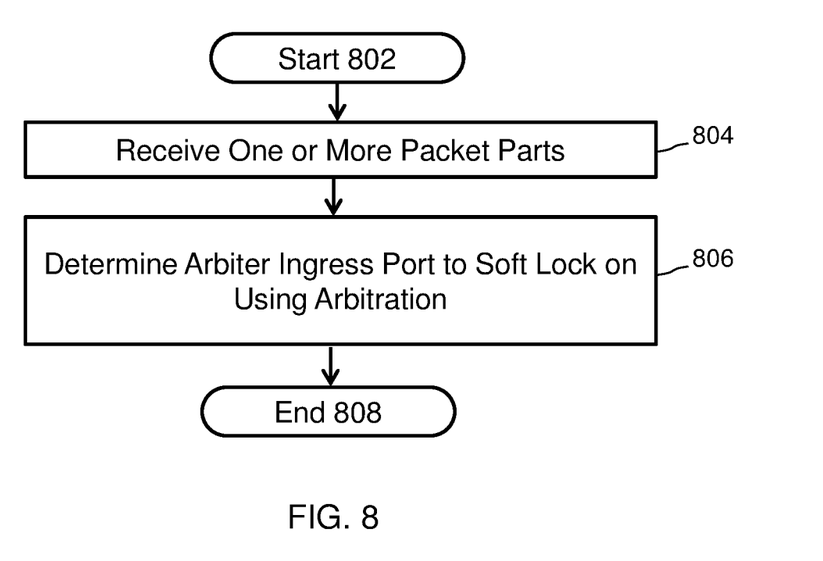
FIG. 8 shows a process to determine a port to soft lock on, in accordance with the various aspects and embodiments of the invention.

Referring now to FIG. 8, soft locking port determination process is started with step 802. In accordance with some embodiments and aspects of the invention, soft locking port determination process described in FIG. 8 receives packet parts in step 804. At step 806, based upon an arbitration scheme, the soft lock port is determined. For example, based upon the state of the network (e.g., which packets can make forward progress) and/or information contained within the packet part (e.g., header information), the arbiter ingress soft lock port may be determined.

According to one or more embodiments, an arbiter creates a list of ingress ports that have packet parts that are contending for access to the egress port and the soft lock port is chosen from the port list. Ports may enter the list as new packet parts arrive and exit the list after the complete packet is transmitted. The position in the list may determine the soft lock port and the ports that may be used if the soft lock port does not have packet parts available that can make forward progress in the network. For example, the first position in the list can be the soft lock port and the second position can be the port used when the soft lock port does not have packet parts available that can make forward progress. If the second port does not have packet parts available that can make forward progress, the list may be traversed to determine a port that does have packet parts available that can make forward progress in the network (e.g., the third port is evaluated to determine is packet parts are available that can make forward progress in the network, repeat for the fourth position, etc.). The list may be sorted based on any arbitration scheme. For example, the first item in the list may be the soft lock port, and when the soft lock packet part is not available that can make forward progress in the network, another ingress port in the port list may have the packet parts transmitted. For another example, the port list may be sorted by priority. For yet another example, the port list may be sorted by the packets that have packet parts already transmitted. For another example, the list could be sorted by arrival time (e.g., FIFO). The list may be sorted by the earliest arriving packet parts first or the newest arriving packet parts first. According to one or more embodiments and aspects of the invention, when no packet parts are available (i.e., for soft lock port and non-soft lock ports), the arbitrator may sit idle until packet parts arrive. According to one or more embodiments and aspects of the invention, when a non-soft lock packet part is transmitted, any processes discloses herein, in accordance with various embodiments and aspects of the invention, can be used to determine the non-soft lock packet part to transmit. For example, when the soft lock port does not have packet parts available that can make forward progress in the network, the next port in the list can be used to transmit packet parts. If the next port does not have packet parts that can make forward progress available, each successive port in the port list may be evaluated to determine if packet parts are available that can make forward progress in the network. When a port that has packet ports available that can make forward progress in the network is found, the packet part is transmitted. As a packet is finished the packet port may be removed from the port list. As new packet parts arrive, the packet port may be added to the list.

Figure 9A:
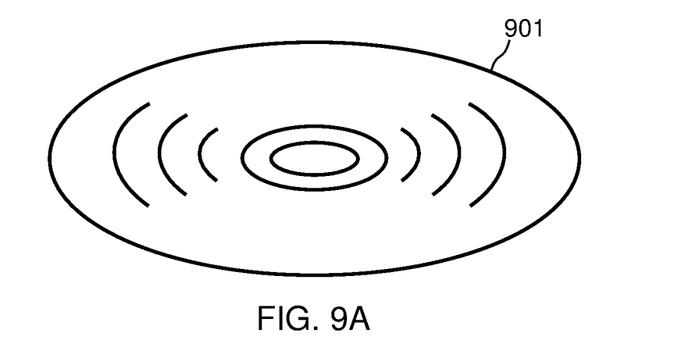
FIG. 9A illustrates a rotating disk non-transitory computer readable medium, according to an embodiment of the invention.

Referring now to FIG. 9A, shown is a non-transitory computer readable rotating disk medium 900 that stores computer code that, if executed by a computer processor, would cause the computer processor to perform methods or partial method steps described herein.

Figure 9B:
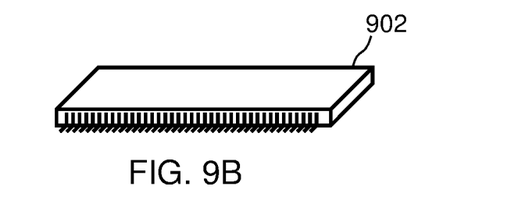
FIG. 9B illustrates a flash random access memory non-transitory computer readable media, according to an embodiment of the invention.

Referring now to FIG. 9B, shown is a non-transitory computer readable random access memory (RAM) chip medium 910 that stores computer code that, if executed by a computer processor, would cause the computer processor to perform methods or partial method steps described herein.

Figure 10A:
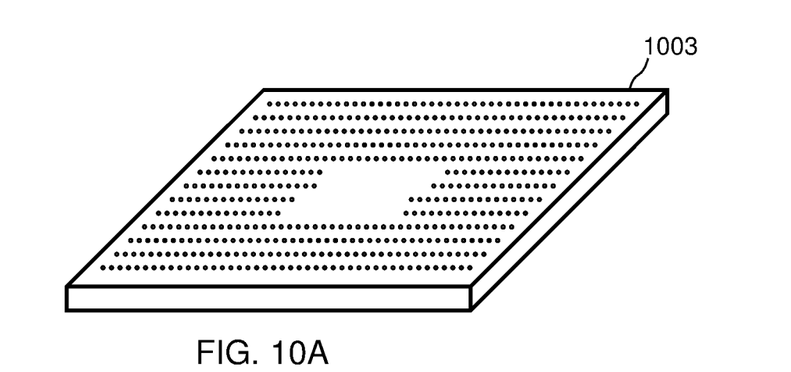
FIG. 10A illustrates the bottom side of a computer processor based system-on-chip, according to an embodiment of the invention.

Referring now to FIG. 10A, shown is the bottom (solder ball) side of a packaged system-on-chip (SoC) 1000, which includes multiple computer processor cores having a component of some embodiments of the invention and that, by executing computer code, perform methods or partial method steps described herein.

Figure 10B:
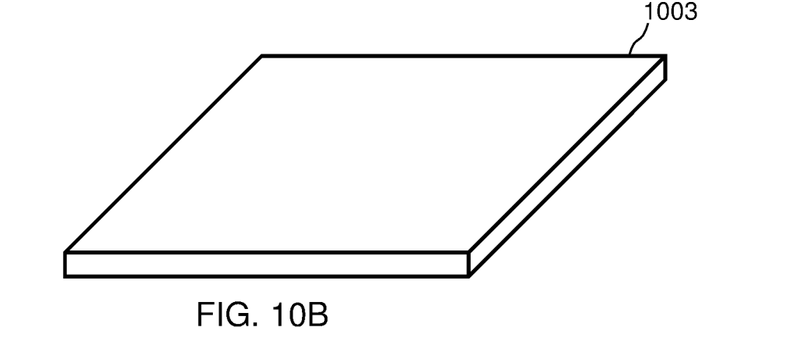
FIG. 10B illustrates the top side of a computer processor based system-on-chip, according to an embodiment of the invention.

Referring now to FIG. 10B, shown is the top side of the SoC 1000.

The example of the one or more non-transitory computer readable media arranged to store such instructions for methods described herein. Whatever machine, which holds non-transitory computer readable media including any of the necessary code, may implement an example or an aspect of the invention. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Figure 11:
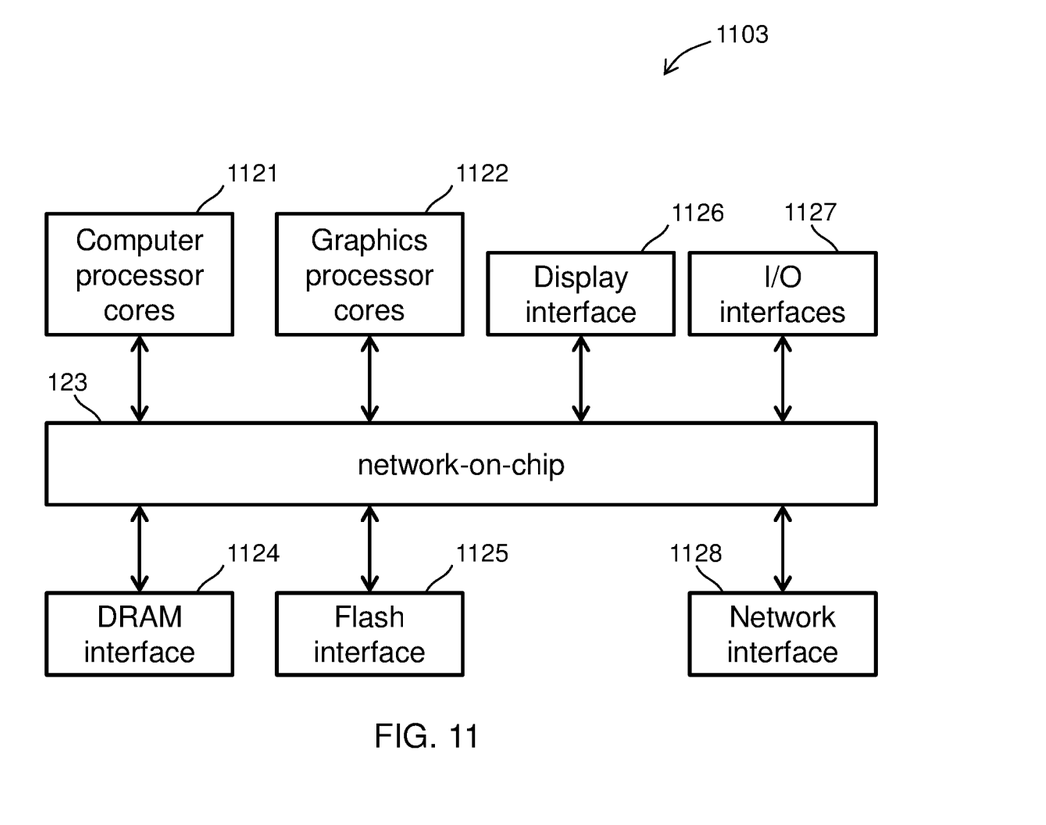
FIG. 11 shows a block diagram of a system-on-chip for devices, according to an embodiment of the invention.

Referring now to FIG. 11, a block diagram of the cores within the system-on-chip 1103 is shown. The system 1103 includes a multi-core computer processor (CPU) 1121 and a multi-core graphics accelerator processor (GPU) 1122. The CPU 1121 and GPU 1122 are connected through a NoC 1123 to a DRAM interface unit 1124 and a Flash RAM interface unit 1125. A display interface unit 1126 controls a display, enabling the system 1103 to output MPEG video and JPEG still image message content. An I/O interface unit 1127 provides for speaker and microphone access for the human-machine interface of a device controlled by SoC 1103. A network interface unit 1128 provides access for the system 1103 to communicate with remote locations (such as servers) over the internet or a wireless network or a local area network.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for handling traffic in a network-on-chip (NoC) that includes at least one virtual channel capable switch having ingress ports and at least one egress port, the method comprising:
   receiving one or more packets, each having one or more packet parts, at the ingress ports;

determining an ingress port of the ingress ports to soft lock onto;
establishing the soft lock on the ingress port resulting in a soft locked port;
transmitting, when soft lock packet parts are available at the soft locked port that can make progress in the NoC, soft lock packet parts to the egress port;
transmitting, when no soft lock packet parts are available at the soft locked port that can make progress in the NoC, other packet parts from another ingress port;
releasing soft locking of the soft locked port upon transmission of all packet parts of a packet;
selecting a second ingress port;
storing identity of the soft locked port; and
soft locking onto the second ingress port when there are packet parts that have not been transmitted at the soft locked port.

2. The method of claim 1 further comprising using an arbitration scheme.

3. The method of claim 2 further comprising creating, using the arbitration scheme, an ingress port list having ports that are contending for an egress port.

4. The method of claim 3, wherein the ingress port list is sorted by at least one of the following: packet parts that can make forward progress, priority, packet parts that have started transmitting, and packet parts arrival time.

5. The method of claim 1, wherein the step of determining is based, at least partially, on an ingress port list.

6. The method of claim 5, wherein the step of determining, is based, at least partially, on a position in the ingress port list.

7. The method of claim 6, wherein the step of determining is based on a first port in the ingress port list.

8. The method of claim 1, wherein the packet parts include:
a packet start part;
a packet middle part; and
a packet end part,
wherein the packet is completely transmitted when the packet start part, the packet middle part, and the packet end part have been send to the egress port.

9. A system comprising:
a processor; and
memory, wherein the memory stores code that is executed by the processor to cause the system to:
determine a network port, which is selected from a plurality of network ports, to soft lock, wherein the network port received a packet having one or more packet parts;
establish a soft lock on the network port;
transmit the one or more packet parts at the network port when at least one packet part is available that can make progress in a network;
transmit another packet part from another network port when no packet parts of the network port are available and can make progress in the network; and
release soft locking of the network port upon transmission of the packet select a second ingress port;
storing identity of the soft locked port; and
soft lock onto the second ingress port when there are packet parts that have not been transmitted at the soft locked port, wherein the second soft locked port includes packet parts for transmission that can progress through the NoC and the soft locked port has packet parts for transmission that will not process through the NoC.

10. The system of claim 9, wherein the system in further caused to determine the network port to soft lock based at least partially on an ingress port list that includes at least a portion of the plurality of network ports.

11. The system of claim 10, wherein the system is further caused to determine the network port to soft lock based, at least partially, on position in the ingress port list.

12. The system of claim 11, wherein the system is further caused to determine the network port to soft lock because the network port is a first port listed in the ingress port list.

13. The system of claim 9, wherein the network port is an ingress port.

14. The system of claim 13, wherein the ingress port includes one or more virtual channels.

15. A method for handling traffic in a network-on-chip (NoC) that includes at least one virtual channel capable switch having ingress ports and at least one egress port, the method comprising:
receiving one or more packets, each having one or more packet parts, at the ingress ports;
determining an ingress port of the ingress ports to soft lock onto;
establishing the soft lock on the ingress port resulting in a soft locked port;
transmitting, when soft lock packet parts are available at the soft locked port that can make progress in the NoC, soft lock packet parts to the egress port;
transmitting, when no soft lock packet parts are available at the soft locked port that can make progress in the NoC, other packet parts from another ingress port;
releasing soft locking of the soft locked port upon transmission of all packet parts of a packet;
selecting a second ingress port;
storing identity of the soft locked port; and
soft locking onto the second ingress port when there are packet parts that have not been transmitted at the soft locked port,
wherein the second soft locked port includes packet parts for transmission that can progress through the NoC and the soft locked port has packet parts for transmission that will not process through the NoC.

* * * * *